US010281332B2

(12) United States Patent
Liang

(10) Patent No.: US 10,281,332 B2
(45) Date of Patent: May 7, 2019

(54) INTEGRATED DEVICE FOR EAR TEMPERATURE MEASUREMENT AND NON-CONTACT TEMPERATURE MEASUREMENT

(71) Applicant: Cao Liang, Guangdong (CN)

(72) Inventor: Cao Liang, Guangdong (CN)

( * ) Notice: Subject to any disclaimer, the term of this patent is extended or adjusted under 35 U.S.C. 154(b) by 21 days.

(21) Appl. No.: 15/659,075

(22) Filed: Jul. 25, 2017

(65) Prior Publication Data

US 2018/0340833 A1    Nov. 29, 2018

(30) Foreign Application Priority Data

May 24, 2017   (CN) .......................... 2017 1 0371288

(51) Int. Cl.
| | | |
|---|---|---|
| *G01J 5/10* | (2006.01) | |
| *G01J 5/08* | (2006.01) | |
| *G01J 5/04* | (2006.01) | |
| *G01J 5/02* | (2006.01) | |
| *G01J 5/00* | (2006.01) | |

(52) U.S. Cl.
CPC ........... *G01J 5/0011* (2013.01); *G01J 5/0025* (2013.01); *G01J 5/021* (2013.01); *G01J 5/0265* (2013.01); *G01J 5/049* (2013.01); *G01J 5/089* (2013.01); *G01J 5/0815* (2013.01); *G01J 5/10* (2013.01)

(58) Field of Classification Search
CPC ........... G01J 5/0011; G01J 5/0265; G01J 5/10
USPC ......................................................... 374/130
See application file for complete search history.

(56) References Cited

U.S. PATENT DOCUMENTS

| | | | | |
|---|---|---|---|---|
| 6,195,581 B1 * | 2/2001 | Beerwerth | ................ | G01J 5/02 374/E13.003 |
| 6,811,306 B2 * | 11/2004 | Gerlitz | ...................... | G01J 5/02 374/121 |
| 7,338,206 B2 * | 3/2008 | Yu | ............................. | G01J 5/02 374/121 |

(Continued)

FOREIGN PATENT DOCUMENTS

JP              11028194       *  2/1999

*Primary Examiner* — Jacques M Saint Surin
(74) *Attorney, Agent, or Firm* — Muncy, Geissler, Olds & Lowe, P.C.

(57) ABSTRACT

The invention discloses an integrated device for ear temperature measurement and non-contact temperature measurement, comprising a main body shell, a temperature measurement control unit and a display unit in the main body shell and a temperature measurement probe at head of the main body shell. The temperature measurement probe is composed of a shell, a temperature sensor in the shell and a non-contact temperature measurement component on the shell. The non-contact temperature measurement component is dismountable and has a non-contact temperature measurement channel in. After the non-contact temperature measurement component and the shell of the temperature measurement probe are assembled, the non-contact temperature measurement channel and the shell of the temperature measurement probe will form a necessary infrared receiving channel to realize non-contact temperature measurement. After the non-contact temperature measurement component is demounted from the shell of the temperature measurement probe, the temperature measurement probe can realize ear temperature measurement independently.

9 Claims, 6 Drawing Sheets

(56) References Cited

U.S. PATENT DOCUMENTS

| | | | |
|---|---|---|---|
| 7,507,025 B2* | 3/2009 | Lumpkin | G01J 5/02 374/121 |
| 9,442,024 B2* | 9/2016 | Shih | G01J 5/047 |
| 2004/0095985 A1* | 5/2004 | Ko | G01J 5/0022 374/100 |
| 2007/0127545 A1* | 6/2007 | Lee | G01J 5/0022 374/131 |
| 2008/0285618 A1* | 11/2008 | Chen | G01J 5/0003 374/121 |
| 2009/0296775 A1* | 12/2009 | Yamaguchi | G01J 5/04 374/121 |

\* cited by examiner

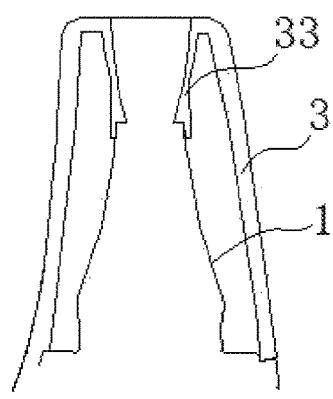
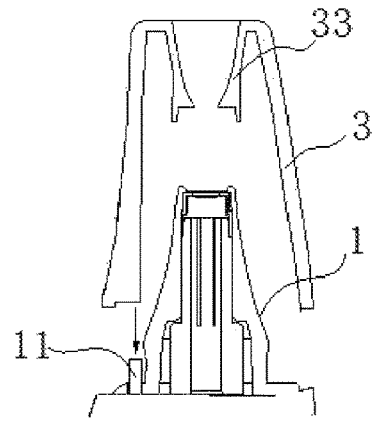
Fig.4            Fig.5
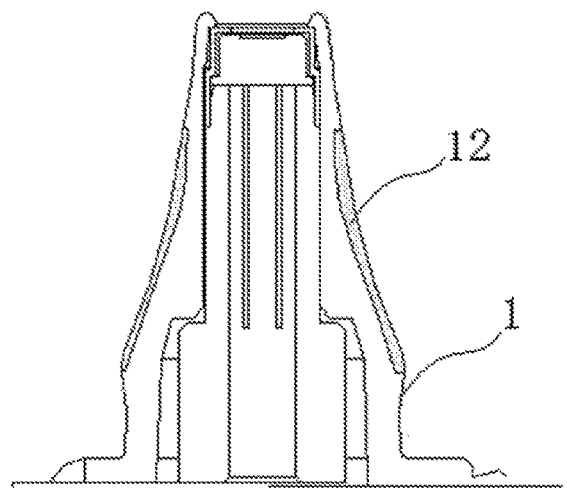
Fig.6
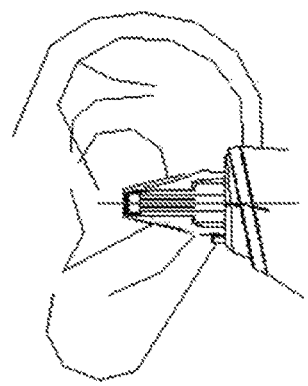
Fig.7

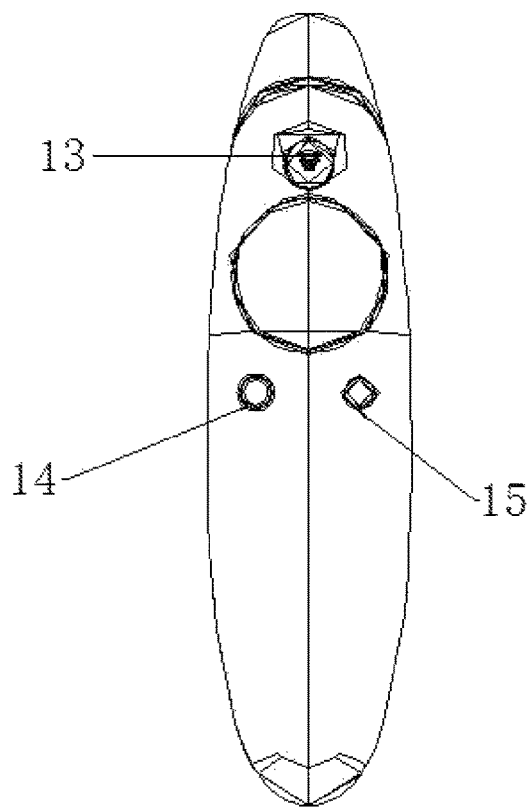
Fig.8
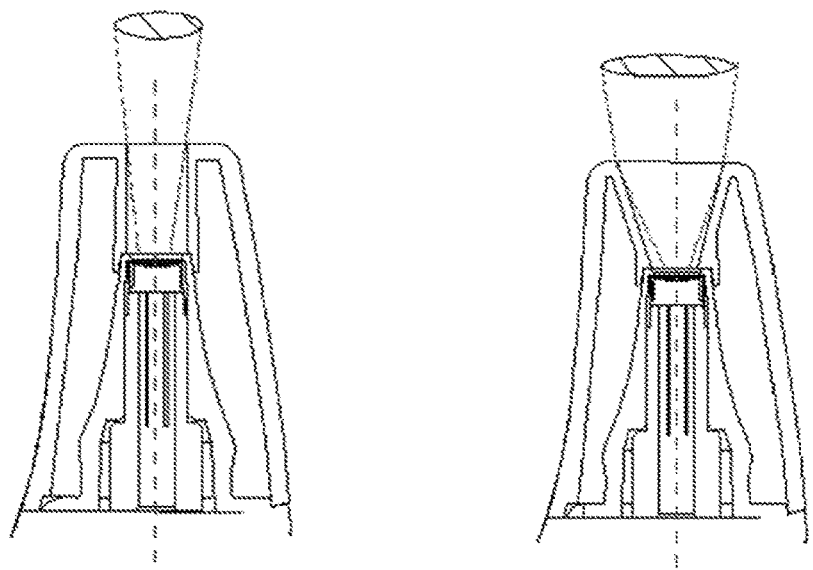
Fig.9                 Fig.10

INTEGRATED DEVICE FOR EAR TEMPERATURE MEASUREMENT AND NON-CONTACT TEMPERATURE MEASUREMENT

TECHNICAL FIELD

The present invention involves in the field of body temperature measuring devices, particularly the field of infrared thermometers integrating ear temperature measurement and infrared non-contact forehead temperature measurement.

BACKGROUND ART

According to the black body radiation law, any object above absolute zero in nature keeps radiating energy to the exterior. The radiated energy and the wavelength distribution highly depend on the surface temperature of the object: The higher the surface temperature of the object, the higher the infrared radiated energy. The infrared thermometer accurately measures a human body skin surface temperature by obtaining the infrared radiated energy of human body skin surface through an infrared receiving sensor and, with help of an algorithm in it, corrects the temperature difference between the forehead temperature and the actual human body temperature with help of the algorithm in the thermometer, thus obtaining the accurate human body temperature. At present, there are three main infrared thermometers on the market, i.e. universal infrared ear thermometers, infrared non-contact thermometers and infrared contact thermometers. Universal infrared ear thermometers: Hypothalamus is an important temperature control organ in the brain and close to ears. Any change of the mean temperature deep in the human body results in a quick change of the temperature in the ears. Interiors of the ears are closed areas not much influenced by the exterior. Thus, the ear temperature is closest to the actual human body temperature. Infrared ear thermometers realize human body temperature measurement by measuring the infrared radiated energy of ear canals and tympanic membranes and are advantageous in accurate temperature measurement. Infrared non-contact thermometers: The forehead is close to the heart and has quick circulation of blood supplied by the large artery and the carotid artery via the temporal artery, so it can suggest human body temperature changes truthfully and in time. When a person has a fever, his brain will be affected first. Upon a temperature change, the brain will begin to adjust the human body first. As a result, the forehead surface temperature will show temperature change quickly. Infrared non-contact thermometers realize human body temperature measurement by measuring the infrared radiated energy of people's foreheads. Each infrared non-contact thermometer can realize accurate measurement even when it is some distance from one's forehead because it has a special non-contact temperature measurement channel for controlling the measured area and strengthening the infrared signal. Infrared contact thermometers: They realize human body temperature measurement by measuring the infrared radiated energy of people's foreheads as non-contact thermometers do; however, they need to be close to people's foreheads for accurate measurement because it needs short measuring distances as a result of inexistence of a special non-contact temperature measurement channel. The existing infrared non-contact thermometers on the market cannot realize ear temperature measurement but be used separately only, making it necessary for a user to buy both an ear thermometer and a non-contact forehead thermometer for the purposes of ear temperature measurement and non-contact forehead temperature measurement. The existing ear thermometers and integrated contact thermometers are disadvantageous in inaccurate temperature measurement and cross infection risk because of short measuring distances or contact with skin and temperature rising in measurement.

CONTENTS OF THE INVENTION

To overcome the disadvantages of the prior art and integrate ear temperature measurement and non-contact forehead temperature measurement, the present invention provides a demountable device with an in-built non-contact temperature measurement channel for controlling the measured area and strengthening the infrared signal.

The present invention presents a technical solution as below: An integrated device for ear temperature measurement and non-contact temperature measurement, comprising a main body shell, a temperature measurement control unit and a display unit in the main body shell and a temperature measurement probe at head of the main body shell. The integrated device is characterized in that: The temperature measurement probe is composed of a shell and a temperature measurement sensor in the shell; there is a demountable non-contact temperature measurement component on the shell; there is a non-contact temperature measurement channel in the non-contact temperature measurement component; after the non-contact temperature measurement channel and the shell of the temperature measurement probe are assembled, a channel necessary for non-contact temperature measurement will form; after the non-contact temperature measurement component is demounted from the shell of the temperature measurement probe, the temperature measurement probe can realize ear temperature measurement independently.

The in-built non-contact temperature measurement channel of the non-contact temperature measurement component is a cylindrical channel.

The in-built non-contact temperature measurement channel of the non-contact temperature measurement component is a conical channel.

The in-built non-contact temperature measurement channel of the non-contact temperature measurement component is a parabolic or cup-shaped channel.

The non-contact temperature measurement channel can be made of plastic, glass, metal, alloy and so on and its surface can be treated through electroplating, paint spraying, polishing, wire drawing, grinding, etc.

The non-contact temperature measurement channel is in the non-contact temperature measurement component (3) and subject to integrated or separate manufacturing; the separate part where the non-contact temperature measurement channel locates is embedded in the non-contact temperature measurement component.

A side of the shell of the temperature measurement probe is provided with an injector pin for switching between ear temperature measurement and non-contact temperature measurement. The injector pin is connected with the temperature measurement control unit circuit in the main body shell and its upper end interacts with inner wall of the non-contact temperature measurement component: When the non-contact temperature measurement component fits over the shell of the temperature measurement probe, the injector pin will be pressed down by the non-contact temperature measurement component and the temperature measurement control unit will detect it and switch to non-contact temperature measurement; after the non-contact temperature measurement component is removed from the shell of the temperature measurement probe, the injector pin will bounce up and the temperature measurement control unit will switch to ear temperature measurement.

Side wall of the shell of the temperature measurement probe is internally provided with a contact sensor for human body sensing. The contact sensor is connected with the temperature measurement control unit circuit. After the temperature measurement probe is put into an ear canal and its shell reaches the skin there, the contact sensor will detect it and the temperature measurement control unit will switch to ear temperature measurement automatically; when the shell of the temperature measurement probe is not in contact with ear canal skin, the temperature measurement control unit will switch to non-contact temperature measurement automatically.

The temperature measurement control unit is provided with mode switching buttons including an ear temperature measurement button, a non-contact forehead temperature measurement button and a non-contact physical temperature measurement button for user to switch between ear temperature measurement and non-contact temperature measurement freely.

In the technical solution, the thermometer integrating ear temperature measurement and non-contact temperature measurement solves disadvantages of the existing infrared thermometers. Each existing infrared thermometer can only realize ear temperature measurement and infrared non-contact temperature measurement or infrared contact temperature measurement, making it necessary for a user to buy both an ear thermometer and a non-contact forehead thermometer for the purposes of ear temperature measurement and non-contact forehead temperature measurement. It has advantages of high cost, resource waste and battery caused environmental pollution. A non-contact temperature measurement channel for controlling the measured area and strengthening the infrared signal is developed and mounted in the demountable non-contact temperature measurement component for the purpose of integration of ear temperature measurement and non-contact temperature measurement based on effective control of the measured area and strengthening of the infrared signal from certain distance. The non-contact temperature measurement channel can be cylindrical, conical, or parabolic or cup-shaped. With help of the specular reflection law of light, infrared light gathers on the sensor, thus maximizing the acquired signal, controlling the lighting area with help of the reflection cup law and finally realizing non-contact temperature measurement. User can realize ear temperature measurement by removing the non-contact temperature measurement component from the shell of the temperature measurement probe because the injector pin will bounce up for temperature measurement mode switching, or inserting the temperature measurement probe into an ear canal and making it in contact with the skin there because the sensor on inner wall of the conical shell of the temperature measurement probe will respond correspondingly. User can switch among ear temperature measurement, non-contact forehead temperature measurement and non-contact physical temperature measurement through the corresponding buttons. The thermometer in the technical solution is simple in operation and more economical and practical because of integration of ear temperature measurement and non-contact temperature measurement.

DESCRIPTION OF FIGURES

FIG. 4 is a structural diagram of the shell of the temperature measurement probe and a parabolic or cup-shaped non-contact temperature measurement channel.

FIG. 5 is a structural diagram of the injector pin on the temperature measurement probe assembled with the non-contact temperature measurement component.

FIG. 6 is a structural diagram of the sensor in the shell of the temperature measurement probe.

FIG. 7 is a diagram about use of the temperature measurement probe with a sensor.

FIG. 8 is a diagram about embodiment of the temperature measurement mode switching buttons.

FIG. 9 to FIG. 11 are diagrams about temperature measurement based on non-contact infrared energy acquisition by cylindrical, conical, or parabolic or cup-shaped non-contact temperature measurement channels.

EMBODIMENTS

Figure 1:
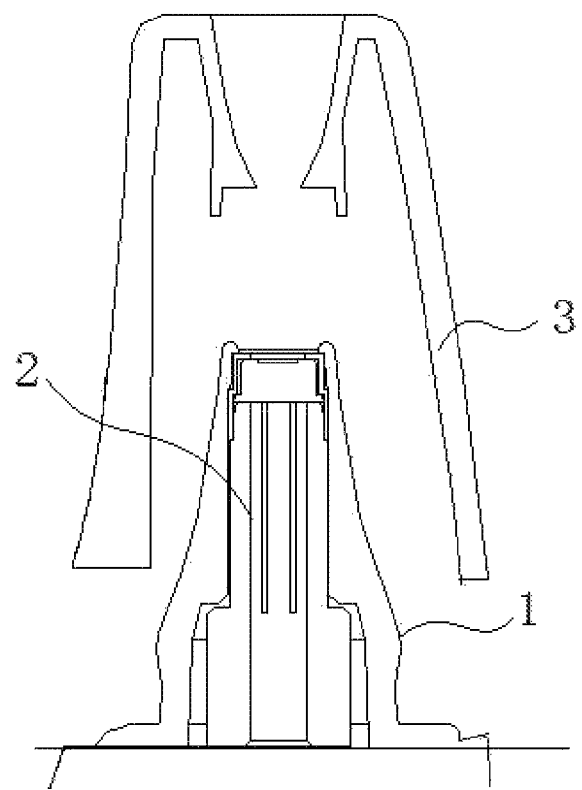
FIG. 1 is a structural diagram of the temperature measurement probe.
Figure 2:
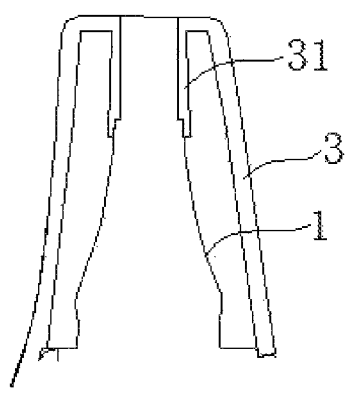
FIG. 2 is a structural diagram of the shell of the temperature measurement probe and a cylindrical non-contact temperature measurement channel.
Figure 3:
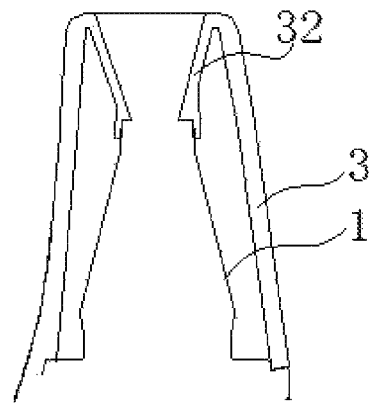
FIG. 3 is a structural diagram of the shell of the temperature measurement probe and a conical non-contact temperature measurement channel.
Figure 11:
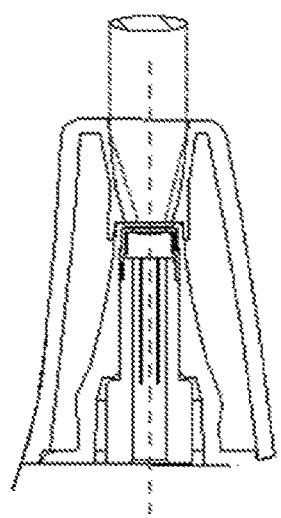

Detailed introduction to the present invention is given below based on the figures and the embodiments.

FIG. 1 to FIG. 4 shows an integrated device for ear temperature measurement and non-contact temperature measurement, comprising a main body shell, a temperature measurement control unit and a display unit in the main body shell and a temperature measurement probe at head of the main body shell. The integrated device is characterized in that: The temperature measurement probe is composed of a shell (1) and a temperature measurement sensor (2) in the shell; there is a demountable non-contact temperature measurement component (3) on the shell: there is a non-contact temperature measurement channel in the non-contact temperature measurement component (3): after the non-contact temperature measurement channel and the shell (1) of the temperature measurement probe are assembled, a channel necessary for non-contact temperature measurement will form; after the non-contact temperature measurement component is demounted from the shell (1) of the temperature measurement probe, the temperature measurement probe can realize ear temperature measurement independently.

Preferably, the non-contact temperature measurement channel in the non-contact temperature measurement component (3) is a cylindrical non-contact temperature measurement channel (31).

Preferably, the non-contact temperature measurement channel in the non-contact temperature measurement component (3) is a conical non-contact temperature measurement channel (32).

Preferably, the non-contact temperature measurement channel in the non-contact temperature measurement component (3) is a parabolic or cup-shaped non-contact temperature measurement channel (33).

The non-contact temperature measurement channel can be made of plastic, glass, metal, alloy and so on and its surface can be treated through electroplating, paint spraying, polishing, wire drawing, grinding, etc.

The non-contact temperature measurement channel is in the non-contact temperature measurement component (3) and subject to integrated or separate manufacturing; the separate part where the non-contact temperature measurement channel locates is embedded in the non-contact temperature measurement component.

Preferably, a side of the shell (1) of the temperature measurement probe is, as in FIG. 5, provided with an injector pin (11) for switching between ear temperature measurement and non-contact temperature measurement. The injector pin (11) is connected with the temperature measurement control unit circuit in the main body shell and its upper end interacts with inner wall of the non-contact temperature measurement component (3): When the non-contact temperature measurement component (3) fits over the shell (1) of the temperature measurement probe, the injector pin (11) will be pressed down by the non-contact temperature measurement component (3) and the temperature measurement control unit will detect it and switch to non-contact temperature measurement; after the non-contact temperature measurement component (3) is removed from the shell (1) of the temperature measurement probe, the injector pin (11) will bounce up and the temperature measurement control unit will switch to ear temperature measurement.

Preferably, side wall of the shell (1) of the temperature measurement probe is, as in FIG. 6 and FIG. 7, internally provided with a contact sensor (12) for human body sensing. The contact sensor (12) is connected with the temperature measurement control unit circuit. After the temperature measurement probe is put into an ear canal and its shell reaches the skin there, the contact sensor (12) will detect it and the temperature measurement control unit will switch to ear temperature measurement automatically; when the shell of the temperature measurement probe is not in contact with ear canal skin, the temperature measurement control unit will switch to non-contact temperature measurement automatically.

Preferably, the temperature measurement control unit is, as in FIG. 8, provided with mode switching buttons including an ear temperature measurement button (13), a non-contact forehead temperature measurement button (14) and a non-contact physical temperature measurement button (15) for user to switch between ear temperature measurement and non-contact temperature measurement freely.

Figure 12:
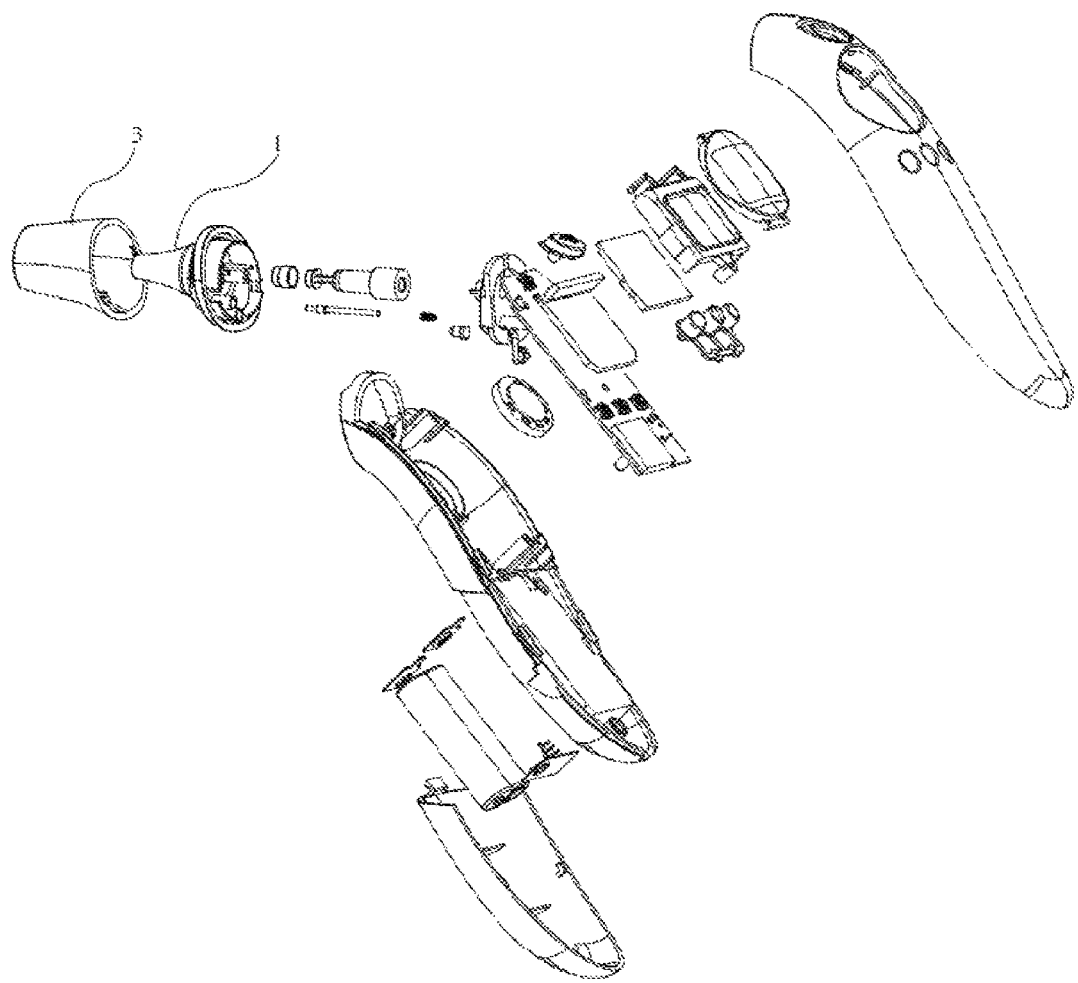
FIG. 12 is an exploded view of the product involved in the embodiment.
Figure 13:
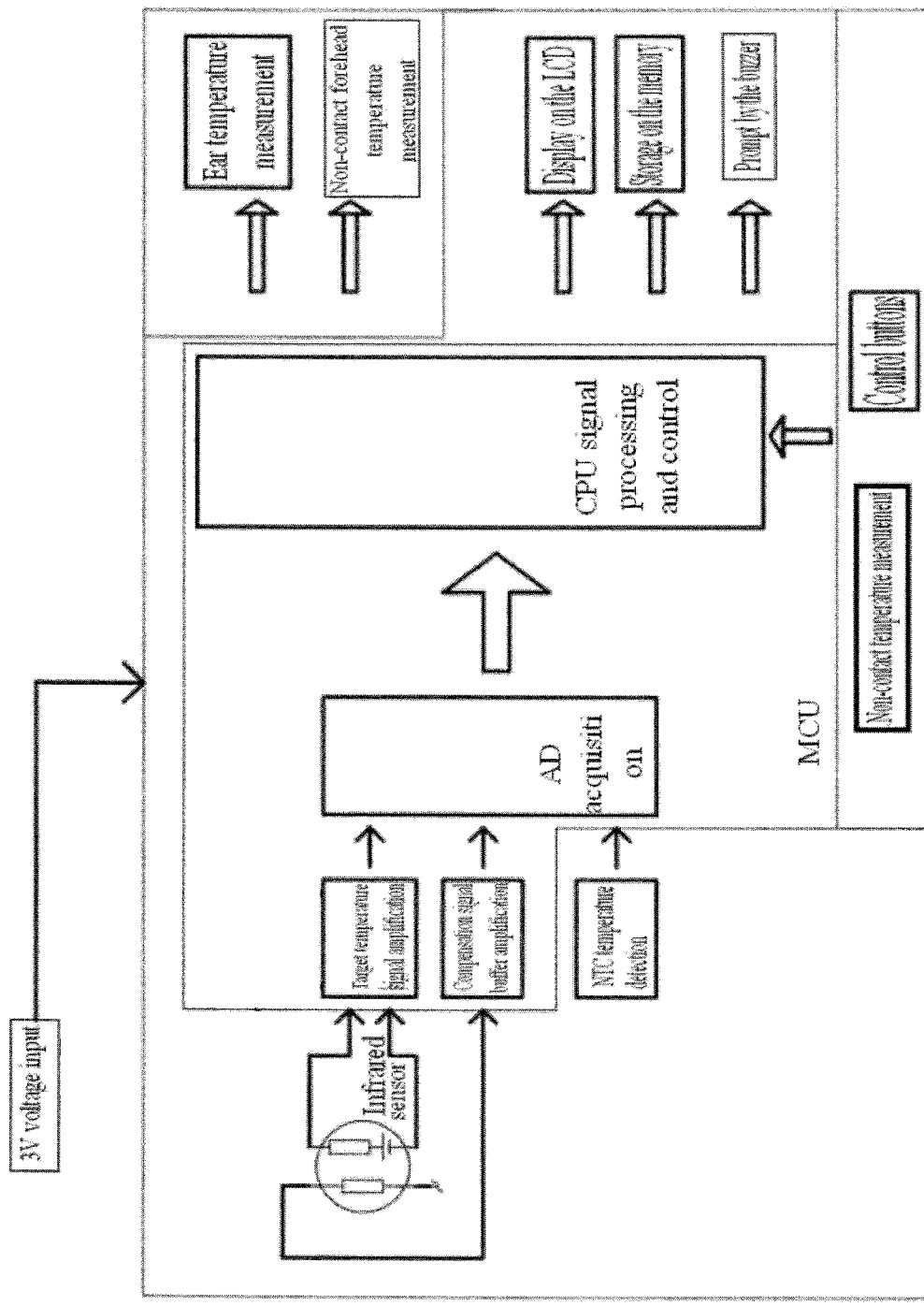
FIG. 13 is a block diagram about operating principle of the embodiment.
Figure 14:
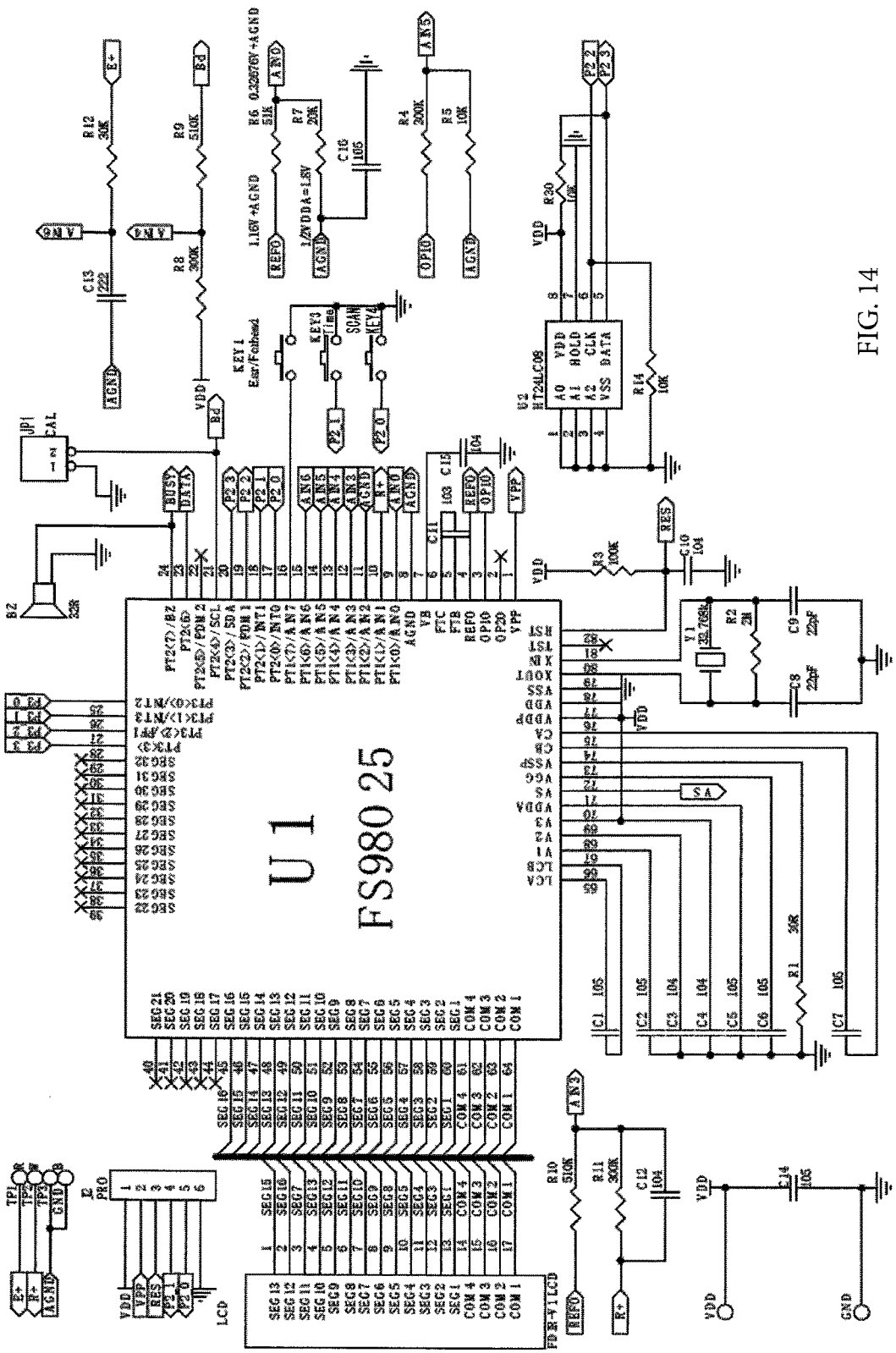
FIG. 14 is a circuit diagram of the embodiment.

FIG. 12 to FIG. 14 are exploded view, operating principle diagram and circuit diagram of the product involved in the embodiment of the present invention. The technical solution of the present invention is not limited to the product outline shape in FIG. 12. The temperature measurement control unit and the display unit in the technical solution are currently universal. The main control PCB as the temperature measurement control unit, the power unit and the LCD as the display unit are all fixed in the main body shell. The LCD is above the main control PCB and is connected with it through a bus bar; the main control PCB is provided with an MCU in connection with an AD acquisition module, a signal amplifier, a storage chip, an NTC temperature detection circuit and a signal processing and control circuit.

Preferably, the MCU model is FS98O25; the storage chip model is HT24LC08; the main control LCD model is FDIR-V16LCD. The infrared energy signal in the target area is acquired by a special infrared sensor, filtered, amplified and transmitted to the AC acquisition module of the MCU to be converted into the target temperature. The target temperature is then converted into a human body clinical temperature through the corresponding human body clinical algorithm and finally displayed on the main control LCD.

Note that after the demountable non-contact temperature measurement component (3) is mounted on the shell of the temperature measurement probe, the temperature measurement sensor (2) in the temperature measurement probe will operate with the non-contact temperature measurement channel in the non-contact temperature measurement component (3), thus realizing non-contact temperature measurement because of control over the effective measured area at certain distance with help of the non-contact temperature measurement channel. The non-contact temperature measurement channel preferably has a cylindrical, conical, or parabolic or cup-shaped outline shape made of plastic, metal, alloy and so on. In regardless of its outline shape and material, the non-contact temperature measurement channel has the same principle, nature and effect and is protected by the technical solution.

Note that FIG. 9 to FIG. 1 are respectively diagrams about non-contact infrared energy acquisition based temperature measurement of the cylindrical, conical and parabolic or cup-shaped non-contact temperature measurement channel in the present invention. The non-contact temperature measurement channels of different outline shapes have different measured areas of infrared radiated energy, different distances of non-contact temperature measurement and different built-in programmed algorithms in the temperature measurement control unit. Therefore, there are no specific limits on the measuring distance and measured area in non-contact temperature measurement. Each thermometer with the non-contact temperature measurement component and non-contact temperature measurement channel designed in the technical solution is protected by the technical solution.

Note that the technical solution introduces three ways to switch between ear temperature measurement and non-contact temperature measurement: The injector pin (11) is pressed down or bounces up through interaction with the non-contact temperature measurement component (3) and the MCU realizes detection and switching; or switch among ear temperature measurement, non-contact forehead temperature measurement and non-contact physical temperature measurement manually through the corresponding buttons; or the sensor in the shell of the temperature measurement probe can realize automatic ear sensing to realize the switching. All of the three ways above are protected by the technical solution.

Of course, the integrated device for ear temperature measurement and non-contact temperature measurement disclosed in the technical solution makes use of the prior art to integrate a WIFI and Bluetooth connection module on a temperature measurement control unit to achieve wireless connection, or wired connection with a cell phone through its headphone jack or USB interface to switch among ear temperature measurement, non-contact forehead temperature measurement and non-contact physical temperature measurement with help of the APP software on the cell phone. It is realizable based on the prior art and means. Any other product realizing temperature measurement mode switching through APP software in addition to the technical solution is not a new patent.

The embodiments above are not restrictions for implementation of the present invention but only examples for introducing the invention. Any obvious changes based on essence of the invention are protected by the invention.

The invention claimed is:

1. An integrated device for ear temperature measurement and non-contact temperature measurement, comprising:

a main body shell;

a temperature measurement control unit;

a display unit in the main body shell;

a temperature measurement probe arranged at a head of the main body shell; and a contact sensor arranged at a side wall of a shell of the temperature measurement probe, wherein the temperature measurement probe is composed of the shell (1) of the temperature measurement probe, a temperature sensor (2) in the shell (1), and a non-contact temperature measurement component (3) equipped on the shell (1) of the temperature measurement probe, the non-contact temperature measurement component (3) being demountable, wherein the non-contact temperature measurement component (3) has a non-contact temperature measurement channel, wherein, after the non-contact temperature measurement component (3) and the shell (1) of the temperature measurement probe are assembled, the non-contact temperature measurement channel and the shell of the temperature measurement probe are configured to form a necessary infrared receiving channel to obtain a non-contact temperature measurement, and wherein, after the non-contact temperature measurement component (3) is demounted from the shell (1) of the temperature measurement probe, the temperature measurement probe is configured to obtain an ear temperature measurement independently.

2. The integrated device for ear temperature measurement and non-contact temperature measurement as set forth in claim 1, wherein the non-contact temperature measurement channel in the non-contact temperature measurement component (3) is a cylindrical channel (31).

3. The integrated device for ear temperature measurement and non-contact temperature measurement as set forth in claim 1, wherein the non-contact temperature measurement channel in the non-contact temperature measurement component (3) is a conical channel (32).

4. The integrated device for ear temperature measurement and non-contact temperature measurement as set forth in claim 1, wherein the non-contact temperature measurement channel in the non-contact temperature measurement component (3) is a parabolic or cup-shaped channel (33).

5. The non-contact temperature measurement channel as set forth in claim 2, wherein the non-contact temperature measurement channel is made of plastic, glass, metal, or alloy, and wherein a surface of the non-contact temperature measurement channel is adapted to be treated through electroplating, paint spraying, polishing, wire drawing, or grinding.

6. The non-contact temperature measurement channel as set forth in claim 2, wherein the temperature measurement channel is in the non-contact temperature measurement component (3) and is subject to integrated or separate manufacturing, and wherein a separate part, where the non-contact temperature measurement channel is adapted to be located, is embedded in the non-contact temperature measurement component.

7. The integrated device for ear temperature measurement and non-contact temperature measurement as set forth in claim 1, wherein the integrated device further comprises an injector pin (11) arranged at the side wall of the shell of the temperature measurement probe, the injector pin being configured to switch between ear temperature measurement and non-contact temperature measurement, wherein the injector pin (11) is connected with the temperature measurement control unit circuit in the main body shell and an upper end of the injector pin interacts with inner wall of the non-contact temperature measurement component (3), wherein, when the non-contact temperature measurement component (3) fits over the shell (1) of the temperature measurement probe, the injector pin (11) is configured to be pressed down by the non-contact temperature measurement component (3) and the temperature measurement control unit is configured to detect the injector pin being pressed down to switch to non-contact temperature measurement, and wherein, after the non-contact temperature measurement component (3) is removed from the shell (1) of the temperature measurement probe, the injector pin (11) is configured to bounce up and the temperature measurement control unit is configured to switch to ear temperature measurement.

8. The integrated device for ear temperature measurement and non-contact temperature measurement as set forth in claim 1, wherein the side wall of the shell (1) of the temperature measurement probe is internally provided with the contact sensor (12) for human body sensing, the contact sensor (12) being connected with the temperature measurement control unit circuit, wherein, after the temperature measurement probe is put into an ear canal and the shell of the temperature measurement probe reaches skin of the ear canal, the contact sensor (12) is configured to detect the skin of the ear canal, wherein the temperature measurement control unit is configured to switch to ear temperature measurement automatically, and wherein, when the shell of the temperature measurement probe is not in contact with the skin of the ear canal, the temperature measurement control unit is configured to switch to non-contact temperature measurement automatically.

9. The integrated device for ear temperature measurement and non-contact temperature measurement as set forth in claim 1, wherein the temperature measurement control unit comprises mode switching buttons comprising:

an ear temperature measurement button (13), a non-contact forehead temperature measurement button (14) and a non-contact physical temperature measurement button (15) for a user to switch between ear temperature measurement and non-contact temperature measurement freely.

* * * * *